(12) United States Patent
Zhuo et al.

(10) Patent No.: US 11,481,275 B2
(45) Date of Patent: Oct. 25, 2022

(54) MANAGING RECONSTRUCTION OF A MALFUNCTIONING DISK SLICE

(71) Applicant: EMC IP Holding Company LLC, Hopkinton, MA (US)

(72) Inventors: Baote Zhuo, Beijing (CN); Chun Ma, Beijing (CN); Hongpo Gao, Beijing (CN); Jibing Dong, Beijing (CN); Jianbin Kang, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 129 days.

(21) Appl. No.: 17/021,275

(22) Filed: Sep. 15, 2020

(65) Prior Publication Data

US 2021/0286676 A1 Sep. 16, 2021

(30) Foreign Application Priority Data

Mar. 12, 2020 (CN) .......................... 202010172698.0

(51) Int. Cl.
*G06F 11/10* (2006.01)
*G06F 11/07* (2006.01)
*G06F 11/34* (2006.01)
*G06F 3/06* (2006.01)

(52) U.S. Cl.
CPC .......... *G06F 11/1088* (2013.01); *G06F 3/061* (2013.01); *G06F 3/0619* (2013.01); *G06F 3/0644* (2013.01); *G06F 3/0646* (2013.01); *G06F 3/0683* (2013.01); *G06F 11/076* (2013.01); *G06F 11/3409* (2013.01)

(58) Field of Classification Search
CPC .............. G06F 11/076; G06F 11/0727; G06F 11/1088; G06F 11/3409
See application file for complete search history.

(56) References Cited

U.S. PATENT DOCUMENTS

| | | | | |
|---|---|---|---|---|
| 7,028,216 | B2* | 4/2006 | Aizawa | G06F 11/1092 714/6.32 |
| 7,266,717 | B2* | 9/2007 | Cassell | G06F 11/0727 714/37 |
| 7,529,965 | B2* | 5/2009 | Ikeuchi | G06F 11/1662 714/6.24 |
| 8,839,028 | B1 | 9/2014 | Polia et al. | |
| 9,542,272 | B2 | 1/2017 | Krishnamurthy et al. | |
| 9,715,431 | B2 | 7/2017 | Chadwell | |
| 10,901,646 | B2 | 1/2021 | Hutchison et al. | |

* cited by examiner

*Primary Examiner* — Nadeem Iqbal
(74) *Attorney, Agent, or Firm* — BainwoodHuang (57) ABSTRACT

Techniques involve: determining, according to a determination that a performance level of a target storage unit is lower than a threshold level, whether idle disk slices that can be used for reconstructing malfunctioning disk slices in the target storage unit exist in a slice pool; determining a priority of the target storage unit according to a determination that the idle disk slices do not exist; and selecting replacing disk slices for reconstructing the malfunctioning disk slices from available storage units based at least in part on the priority, wherein the available storage units have performance levels not lower than the threshold level. In this way, data loss due to the off-line of storage units is prevented; and meanwhile, the performance of the entire storage system can be globally stabilized.

16 Claims, 7 Drawing Sheets

MANAGING RECONSTRUCTION OF A MALFUNCTIONING DISK SLICE

CROSS-REFERENCE TO RELATED APPLICATION

This application claims priority to Chinese Patent Application No. CN202010172698.0, on file at the China National Intellectual Property Administration (CNIPA), having a filing date of Mar. 12, 2020, and having "METHOD, DEVICE AND COMPUTER PROGRAM PRODUCTS FOR STORAGE MANAGEMENT" as a title, the contents and teachings of which are herein incorporated by reference in their entirety.

TECHNICAL FIELD

Embodiments of the present disclosure generally relate to the field of data storage and, more particularly, to a method for storage management, an electronic device and a computer program product.

BACKGROUND

At present, if a solid-state disk in a storage system malfunctions, a disk slice on a spare disk can be used to replace a consumed disk slice in the malfunctioning solid-state disk according to the index of disk slices included in the solid-state disk, and data of the replaced disk slice can be restored on the spare disk slices. Here, a consumed disk slice indicates that the storage space of this disk slice has been allocated for constructing a specific storage unit (Uber).

Once the available disk slices in the spare disk are exhausted, it is not possible to restore other disk slices affected by the malfunctioning disk. If another solid-state disk malfunctions at this time, data loss of the storage unit may be caused.

It has been known that constructed storage units are classified into different types according to different types of data stored on the storage units. For example, some storage units store metadata, while other storage units store user data. Once the storage unit storing metadata are offline, the storage units storing the user data are inaccessible.

SUMMARY OF THE INVENTION

Embodiments of the present disclosure relate to a method for storage management, an electronic device and a computer program product.

In the first aspect of the present disclosure, a method for storage management is provided. This method includes: determining, according to a determination that a performance level of a target storage unit is lower than a threshold level, whether idle disk slices that can be used for reconstructing malfunctioning disk slices in the target storage unit exist in a slice pool; determining a priority of the target storage unit according to a determination that the idle disk slices do not exist; and selecting replacing disk slices for reconstructing the malfunctioning disk slices from available storage units based at least in part on the priority, wherein the available storage units have performance levels not lower than the threshold level.

In the second aspect of the present disclosure, an electronic device is provided. This device includes a processor and a memory coupled to the processor, wherein the memory stores instructions to be executed, which, when executed by the processor, cause the electronic device to perform actions including: determining, according to a determination that a performance level of a target storage unit is lower than a threshold level, whether idle disk slices that can be used for reconstructing malfunctioning disk slices in the target storage unit exist in a slice pool; determining a priority of the target storage unit according to a determination that the idle disk slices do not exist; and selecting replacing disk slices for reconstructing the malfunctioning disk slices from available storage units based at least in part on the priority, wherein the available storage units have performance levels not lower than the threshold level.

In the third aspect of the present disclosure, a computer program product is provided, the computer program product being tangibly stored on a non-transitory computer-readable medium and including machine-executable instructions which, when executed, cause a machine to implement the steps of the above method in the first aspect.

The summary is provided to introduce the selection of concepts in a simplified form, which will be further described in the detailed description below. This summary is neither intended to identify key features or main features of the content of the present disclosure, nor intended to limit the scope of the content of the present disclosure.

DESCRIPTION OF THE DRAWINGS

The same or corresponding reference numerals in the various drawings represent the same or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, various example embodiments of the present disclosure will be described in detail with reference to the accompanying drawings. It should be noted that these drawings and descriptions relate only to example embodiments. It should be noted that, based on the following description, it is easy to conceive of alternative embodiments of the structures and methods disclosed herein, and these alternative embodiments may be used without departing from the principles claimed in this disclosure.

It should be understood that these example embodiments are given only to enable those skilled in the art to better understand and thereby implement the present disclosure, and not to limit the scope of the present disclosure in any way.

The terms "including," "comprising," and similar terms used herein should be understood as open-ended terms, that is, "including/comprising but not limited to." The term "based on" means "based at least in part on." The term "some embodiments" means "at least some embodiments"; and the term "another embodiment" means "at least one further embodiment." Related definitions of other terms will be given in the description below.

Figure 1:
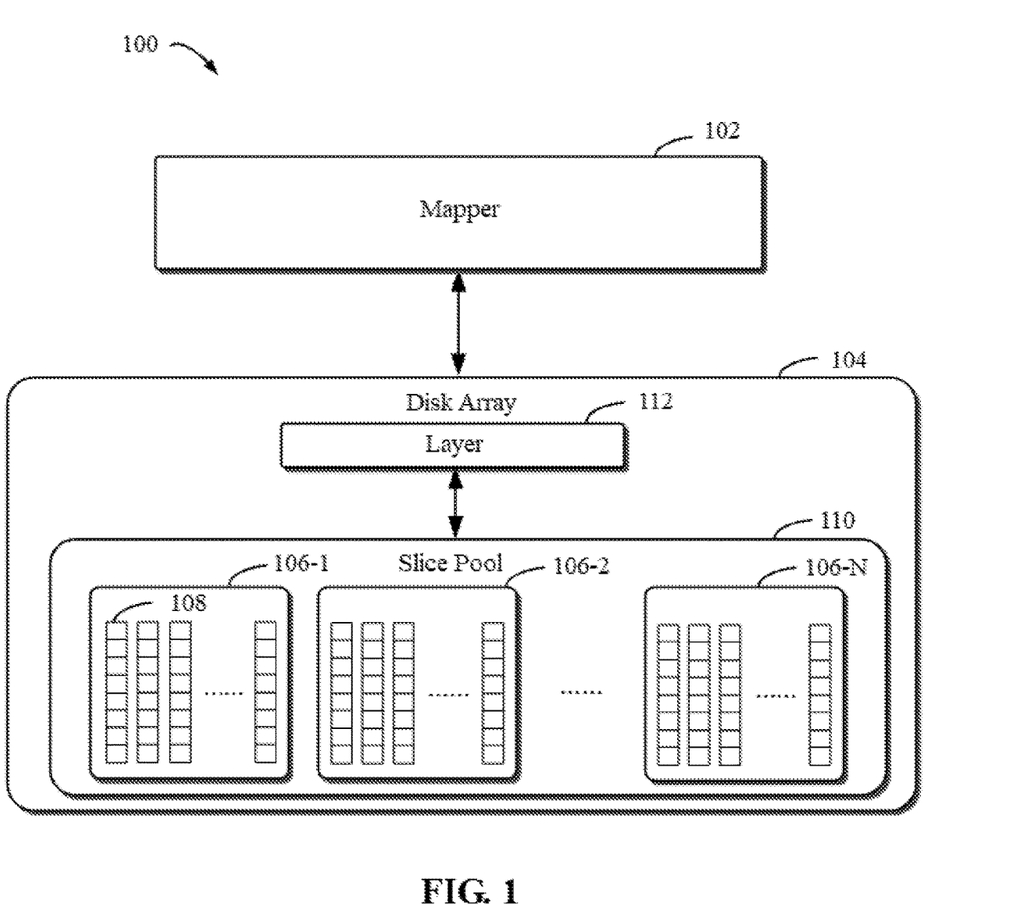
FIG. 1 illustrates a schematic diagram of an example operating environment in which embodiments of the present disclosure may be implemented.

FIG. 1 illustrates a schematic diagram of an example system according to the present disclosure. As shown in FIG. 1, system 100 includes mapper 102. Mapper 102 is configured to map an address in a user request to a physical space where data is stored so as to facilitate data reading or writing by a user.

Mapper 102 can provide a logical storage space of a predetermined size to an upper-layer application. In some examples, the size of this logical storage space can be 8 EB. The above examples are only used to illustrate the size of the logical storage space that can be provided, and are not a limitation on the present disclosure. A logical storage space can be set in any size as needed.

In mapper 102, any suitable structure may be adopted to maintain the mapping between logical addresses and physical addresses. In one example, it employs a B+ tree to maintain the mapping between logical addresses and physical addresses. This mapping includes a mapping of virtual logical blocks to physical blocks. A virtual logical block includes one or more nodes. The above examples are for illustration only, and are not intended to limit the present disclosure. The mapping relationship between logical addresses and physical addresses in mapper 102 can be set to any suitable structure as needed.

In one example, the node stores the addresses of the physical blocks. In one example, the minimum granularity of this mapping is a 4 KB page. The above examples are for illustration only, and are not intended to limit the present disclosure. The granularity of mapping can be set in any size and any suitable information associated with the physical blocks can be stored as needed.

In one example, if mapper 102 receives a write request, mapper 102 first aggregates enough 4 KB pages into a 2 MB Physical Large Block (PLB), and then executes the write request in the physical large block as a unit. In the case where mapper 102 receives a read request, mapper 102 can execute the read request in a physical address of 2 MB or less as a unit.

Storage system 100 further includes disk array 104. In one example, the disk array may be a redundant array of independent disks (RAID). In another example, the disk array may be of any suitable disk array type. The disk array has a predetermined width. The width of the disk array refers to the number of disks constituting a stripe in the disk array. In one example, a RAID5 with a disk array width of (4+1) indicates that the number of disks constituting an RAID5 stripe is (4+1) with 4 disks for storing data and one disk for storing check data.

Disk array 104 includes slice pool 110. Slice pool 110 includes one or more disks 108. Each disk 108 is divided into one or more disk slices of a fixed size. FIG. 1 illustrates disk 108 including eight disk slices. The above examples are for illustration of the present disclosure only, and are not intended to limit the present disclosure. In other embodiments, each disk can be set to include any number of disk slices as needed.

The size of the disk slice can be set as any value as needed. In one example, the size of the disk slice is 4 GB. The above examples are for illustration of the present disclosure only, and are not intended to limit the present disclosure. In other embodiments, a disk slice of any size can be set as needed.

Each disk in slice pool 110 is grouped into one or more RAID Resilience Sets (RRSs) 106-1, 106-2, ..., and 106-N (which may be collectively referred to herein as RAID resilience set 106), where N is a positive integer greater than 1. Considering the reliability of RAID, the number of disks included in an RRS needs to be limited. Therefore, the number N of RAID resilience sets 106 depends on the number of disks. Generally, the number of disks included in each RRS is limited to 25. If the number of disks exceeds 25, a new RRS needs to be created.

The slices in RAID resilience set 106 may be used to form one or more logical storage units. In one example, the slices in one logical storage unit are all from one RAID resilience set. One logical storage unit is equivalent to a conventional RAID. In one example, mapper 102 stores a mapping relationship between logical storage units and physical large blocks. The above examples are for illustration of the present disclosure only, and are not intended to limit the present disclosure.

Disk array 104 further includes one or more layers. The disk array including layers 112 is shown in FIG. 1 for illustrative purposes only. The above examples are for illustration of the present disclosure only, and are not intended to limit the present disclosure. Any suitable number of layers can be set as needed.

Layer 112 is read and/or invoked by mapper 102. Layer 112 includes one or more logical storage units. This logical storage unit can be viewed as a group of RAID stripes associated with multiple disk slices. Alternatively or additionally, the logical storage units in layer 112 have the same disk array format. In one example, different layers may have different disk array formats. In another example, different layers may have the same disk array format.

In some examples, the logical storage units in layer 112 may have suitable disk array types and/or disk array widths. For example, the logical storage unit adopts a RAID 5 with a disk array width of (4+1), a RAID 5 with a disk array width of (8+1), or a RAID 5 with a disk array width of (16+1). The above examples are for illustration only, and are not intended to limit the present disclosure. The logical storage units in the layer can adopt any suitable disk array type and disk array width as needed.

As described above, once a certain disk 108 in slice pool 110 malfunctions, a spare disk slice in slice pool 110 (one or more disk slices in slice pool 110 can be predesignated as spare disk slices) can be used to replace a consumed disk slice in malfunctioning disk 108 according to the index of disk slices included in malfunctioning disk 108, and data of the replaced disk slice can be restored on the spare disk slice.

However, once the available spare disk slices are exhausted, it is not possible to restore other disk slices affected by malfunctioning disk 108. If another disk in slice pool 110 malfunctions again at this time, data loss of the storage unit may be caused.

Therefore, embodiments of the present disclosure provide a solution for storage management. This solution can determine the order of reconstruction of storage units according to priorities of the storage units constructed from disk slices in a malfunctioning disk, so as to ensure that storage units with higher priorities can be reconstructed first. In this way, the risk of data loss can be reduced, thereby improving the system performance.

A disk slice in a disk is consumed for constructing a storage unit (Uber). The constructed storage units are classified into different types according to different types of data stored on the storage units. For example, some storage units may be regarded as storage units for storing metadata, and such storage units may constitute a metadata layer, while the other storage units may be regarded as storage units for storing user data, and such storage units may constitute a user data layer.

Compared with the user data layer, the metadata layer has a more significant impact on the performance of the storage units, because once the metadata layer goes offline, the user data will not be accessible even if the storage units of the user data layer are intact.

Figure 2:
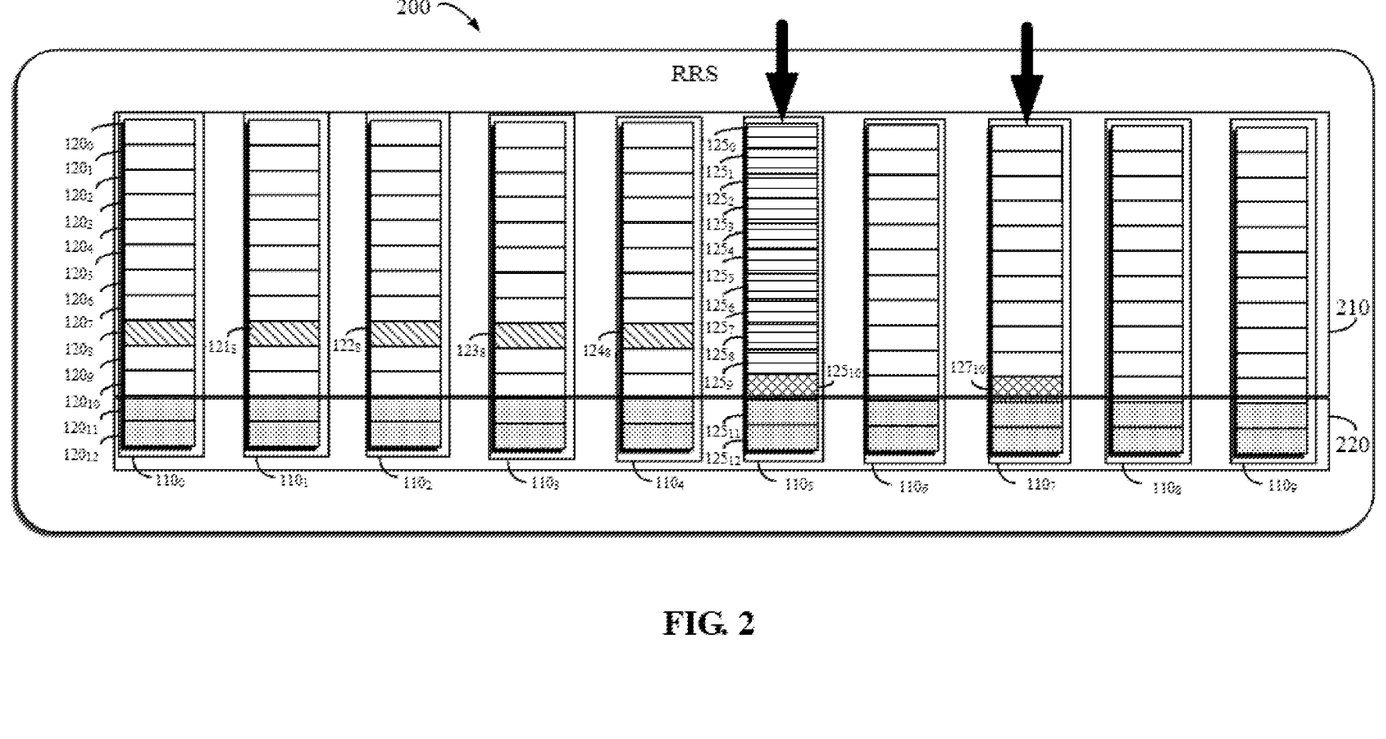
FIG. 2 illustrates a schematic diagram of an RRS in a storage system according to embodiments of the present disclosure.

FIG. 2 illustrates a schematic diagram of RRS 200 in a storage system according to embodiments of the present disclosure. A situation will be described with reference to FIG. 2, in which the performance of a storage unit belonging to the metadata layer degrades.

As shown in FIG. 2, RRS 200 may include multiple disks $110_0$-$110_9$. Each disk may include multiple disk slices. For example, disk $110_0$ includes disk slices $120_0$-$120_{12}$. In the slice pool constituted by disks $110_0$-$110_9$, disk slice section 210 has been used, while disk slice section 220 is allocated to the spare disk so as to facilitate replacement of disk slices that go offline.

In RRS 200 shown in FIG. 2, disk slices $120_8$, $121_8$, $122_8$, $123_8$ and $124_8$ are allocated for constructing a first storage unit which is used, for example, for storing user data. Disk slices $125_{10}$ and $127_{10}$ are allocated for constructing a second storage unit which is used, for example, for storing metadata.

If disk $110_5$ goes offline, a second storage device using disk slice $125_{10}$ in disk $110_5$ will be affected and then the performance will degrade. However, when trying to use disk slice section 220 to replace disk slice $125_{10}$, it is found that there is no idle spare disk slice in disk slice section 220 that can replace disk slice $125_{10}$. If another disk $110_7$ goes offline at this time, the second storage device will switch to an off-line state. Since the data stored in the second storage device is metadata, this makes the first storage device and other storage devices in the user data layer inaccessible.

In addition, storage units in the user data layer store different construction types. For example, as described above, RAID5 indicates that the number of disks constituting an RAID5 stripe is (4+1) with 4 disks for storing data and one disk for storing check data, and thus some storage units can be RAID5-type storage units. However, it is also possible to store an RAID6-type storage unit, that is, the number of disks constituting an RAID6 stripe is (4+2) with 4 disks for storing data and 2 disks for storing check data.

The following case may exist for RAID6-type storage units. If there is a disk going offline and this disk causes the storage location of a certain storage unit inaccessible, that is, causing the performance of the storage unit to degrade, then this storage unit also has a disk slice for redundancy protection. However, if another disk associated with this storage unit subsequently goes offline, this storage unit has no disk that can be used for redundancy protection. If a third disk associated with this storage unit goes offline, the data of this storage unit will be lost.

Therefore, in the user data layer, there may be intact storage units, storage units with performance degradation, and storage units that completely go offline (in which data are lost), which will affect the performance of the entire system. Therefore, consideration should be given to avoiding, as much as possible, the situation in which storage units completely go offline.

Figure 3:
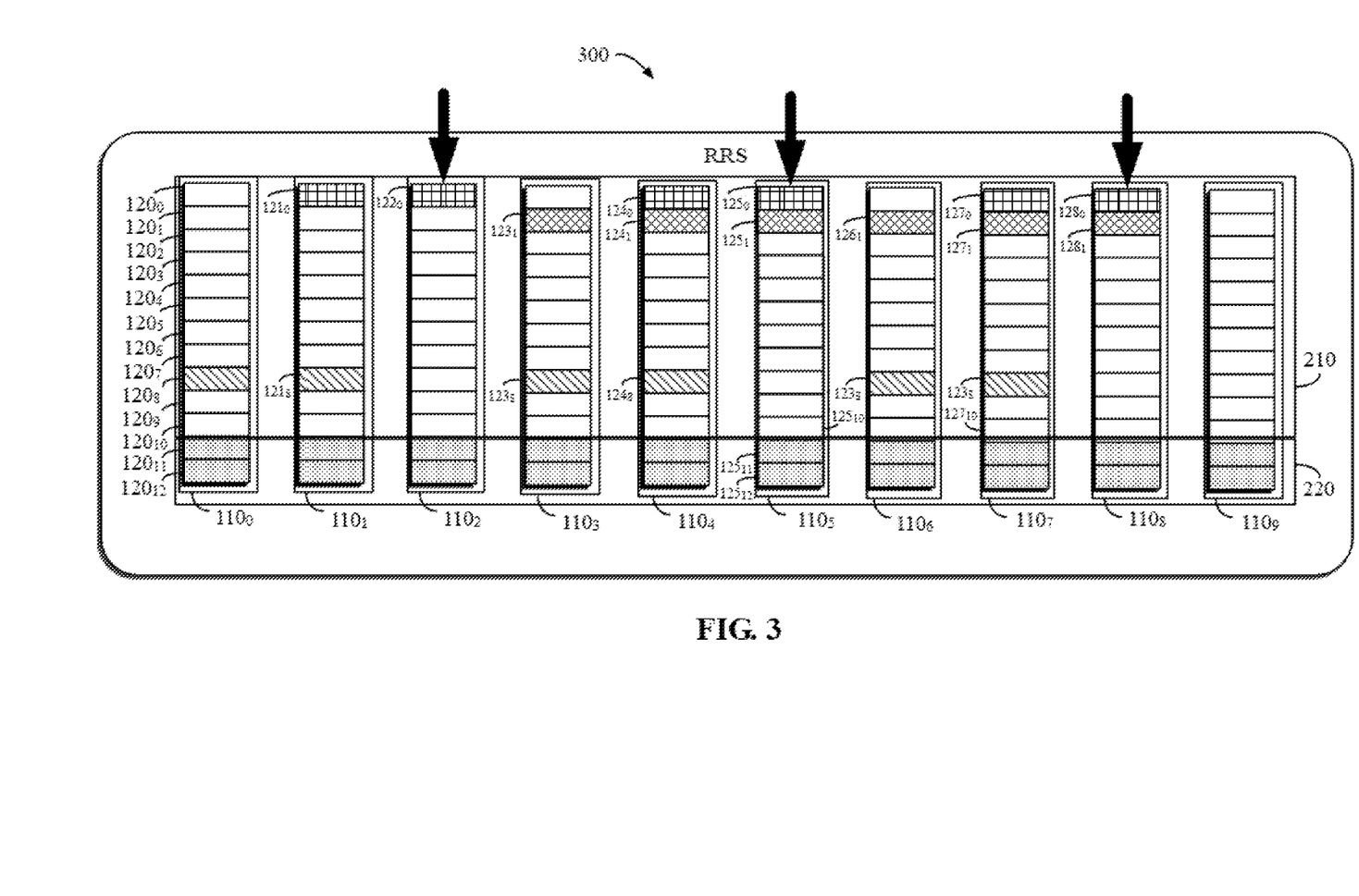
FIG. 3 illustrates a schematic diagram of an RRS in a storage system according to embodiments of the present disclosure.

FIG. 3 illustrates a schematic diagram of RRS 300 in a storage system according to embodiments of the present disclosure. A situation will be described with reference to FIG. 3, in which the performance of a storage unit belonging to the user data layer degrades.

As shown in FIG. 3, RRS 300 may include multiple disks $110_0$-$110_9$. Each disk may include multiple disk slices. For example, disk $110_0$ includes disk slices $120_0$-$120_{12}$. In the slice pool constituted by disks $110_0$-$110_9$, disk slice section 210 has been used, while disk slice section 220 is allocated to the spare disk so as to facilitate replacement of disk slices that go offline.

In RRS 300 shown in FIG. 3, disk slices $121_0$, $122_0$, $124_0$, $125_0$, $127_0$, and $128_0$ are allocated for constructing a first storage unit which is used, for example, for storing user data. This storage unit is an RAID6-type storage unit. Disk slices $123_1$, $124_1$, $125_1$, $126_1$, $127_1$, and $128_1$ are allocated for constructing a second storage unit which is also used, for example, for storing user data and is an RAID6-type storage unit. Disk slices $120_8$, $121_8$, $123_8$, $124_8$, $126_8$, and $127_8$ are allocated for constructing a third storage unit which is also used, for example, for storing user data and is an RAID6-type storage unit.

When disk $110_2$ goes offline, the first storage unit suffers performance degradation first, and one disk slice is left for redundancy protection; thereafter, when disk $110_5$ goes offline, the second storage unit also suffers performance degradation, and one disk slice is left for redundantly protection. In the case where there is no idle spare disk slice in disk slice section 220 of RRS 300, if disk $110_8$ goes offline, the first storage unit changes to an off-line state. It can be seen that the third storage unit is still in an optimal state at this time.

By combining FIG. 2 and FIG. 3, for the degradation or off-line phenomenon of the storage unit caused by the off-line of the disk, the disk slices of the storage unit that stores user data can be used to replace the affected storage unit that stores metadata, so that the storage unit storing the metadata should be kept intact as much as possible or at least in an on-line state. If the storage unit storing the user data is degraded or offline, it can be taken into consideration to use the storage unit in the optimal state to replace the storage unit that is about to be disconnected. This method can also be called "preemptive sparing".

Figure 4:
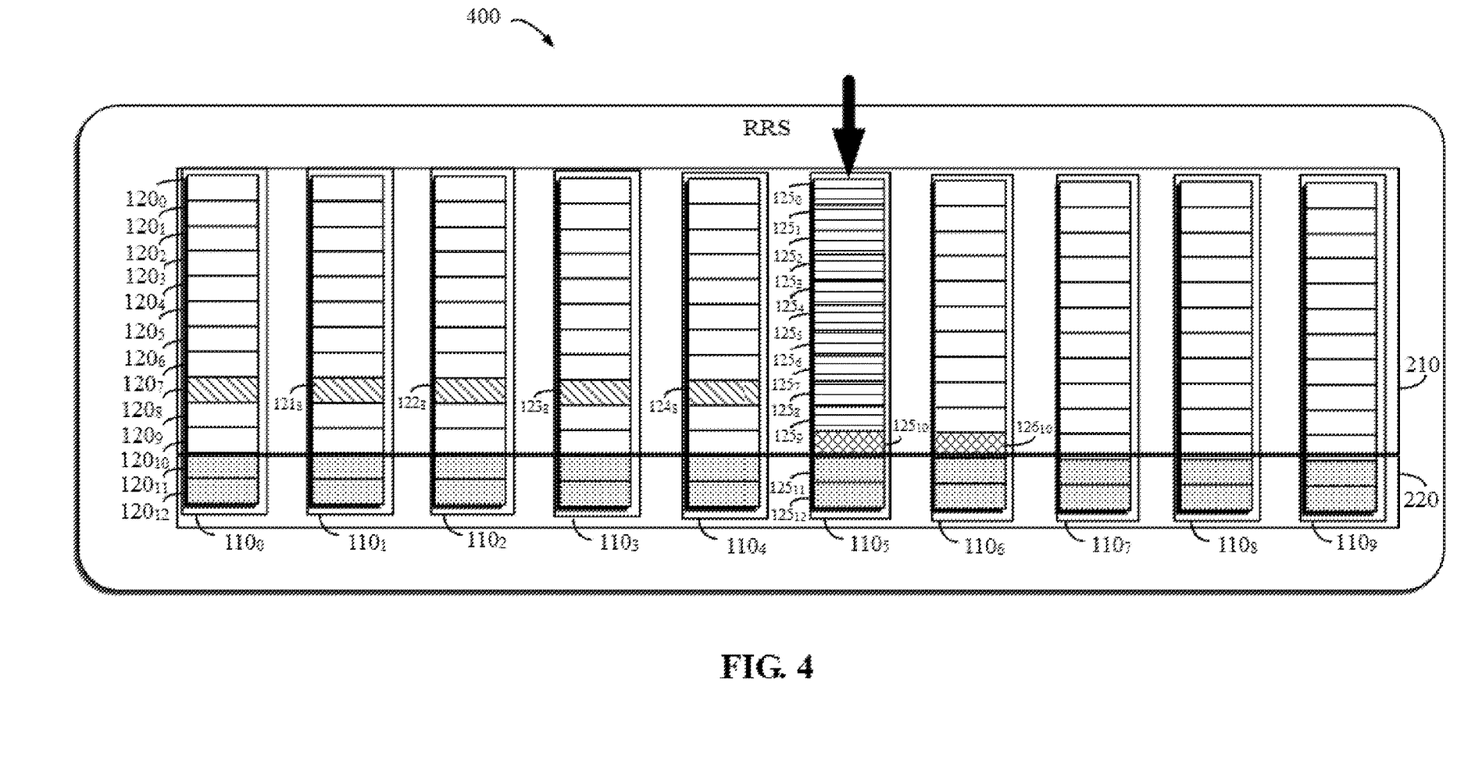
FIG. 4 illustrates a schematic diagram of an RRS in a storage system according to embodiments of the present disclosure.

FIG. 4 illustrates a schematic diagram of RRS 400 in a storage system according to embodiments of the present disclosure.

As shown in FIG. 4, RRS 400 may include multiple disks $110_0$-$110_9$. Each disk may include multiple disk slices. For example, disk $110_0$ includes disk slices $120_0$-$120_{12}$. In the slice pool constituted by disks $110_0$-$110_9$, disk slice section 210 has been used, while disk slice section 220 is allocated to the spare disk so as to facilitate replacement of disk slices that go offline.

In RRS 400 shown in FIG. 4, disk slices $120_8$, $121_8$, $122_8$, $123_8$ and $124_8$ are allocated for constructing a first storage unit which is used, for example, for storing user data. Disk slices $125_{10}$ and $126_{10}$ are allocated for constructing a second storage unit which is used, for example, for storing metadata.

Priorities can be set for the storage units in advance, for example, a storage unit (storing metadata) of the metadata layer has a higher priority, while a storage unit (storing user data) of the user data layer has a lower priority.

When disk $110_5$ goes offline, disk slices $125_0$-$125_{12}$ on disk $110_5$ are all in an unavailable state. Once disk $110_5$ goes offline, a storage unit that has degraded performance due to the off-line of disk $110_5$ can be first determined. It can be seen that disk slice $125_{10}$ in disk $110_5$ is used to construct the second storage unit, so the second storage unit is degraded.

It can be determined whether in disk slice section 220 there exists an idle spare disk slice that can be used to reconstruct disk slice $125_{10}$ in the determined second storage unit. If it is determined that there is no idle disk slice, the priority of the second storage unit where the degradation occurs is determined.

It has been known that this second storage unit stores metadata, so it can be determined that this storage unit has a higher priority. Therefore, a disk slice can be selected from other available storage units that have been constructed with intact performance to replace disk slice $125_{10}$ in the second storage unit.

For example, the first storage unit is determined as an available storage unit with intact performance. The priority of the first storage unit needs to be determined. If the priority of the first storage unit is the same as that of the second storage unit, a disk slice in the first storage unit cannot be used to replace a disk slice in the second storage unit.

In the embodiment of FIG. 4, the first storage unit stores user data, so the first storage unit has a lower priority than that of the second storage unit, and thus the disk slice of the first storage unit can be "preempted" to replace disk slice $125_{10}$ in the second storage unit.

In addition, it is necessary to determine disks to which the disk slices in the second storage unit other than the to-be-replaced disk slice $125_{10}$ belong, because disk slices constructing the same storage unit may not belong to the same disk. In addition to disk slice $125_{10}$, disk slices constructing the second storage unit further include disk slice $126_{10}$ which belongs to disk $110_6$. It can be seen that none of disk slices $120_8$, $121_8$, $122_8$, $123_8$, and $124_8$ constructing the first storage unit belongs to disk $110_6$. Therefore, any one of disk slices $120_8$, $121_8$, $122_8$, $123_8$, and $124_8$ of the first storage unit can be selected to replace disk slice $125_{10}$ in the second storage unit.

For example, disk slice $125_{10}$ is replaced with disk slice $120_8$ of the first storage unit. After the replacement of the disk slice, disk slices $121_8$, $122_8$, $123_8$, and $124_8$ are allocated for constructing the first storage unit which is used, for example, for storing user data. Disk slices $120_8$ and $126_{10}$ are allocated for constructing the second storage unit, and data of disk slice $126_{10}$ can be used to restore data of disk slice $125_{10}$ on disk slice $120_8$ so as to reconstruct the second storage unit.

In this way, the performance of the second storage unit for storing metadata is guaranteed to be intact, and at the same time, the first storage unit for storing user data will only experience performance degradation without being caused to completely go offline.

Figure 5:
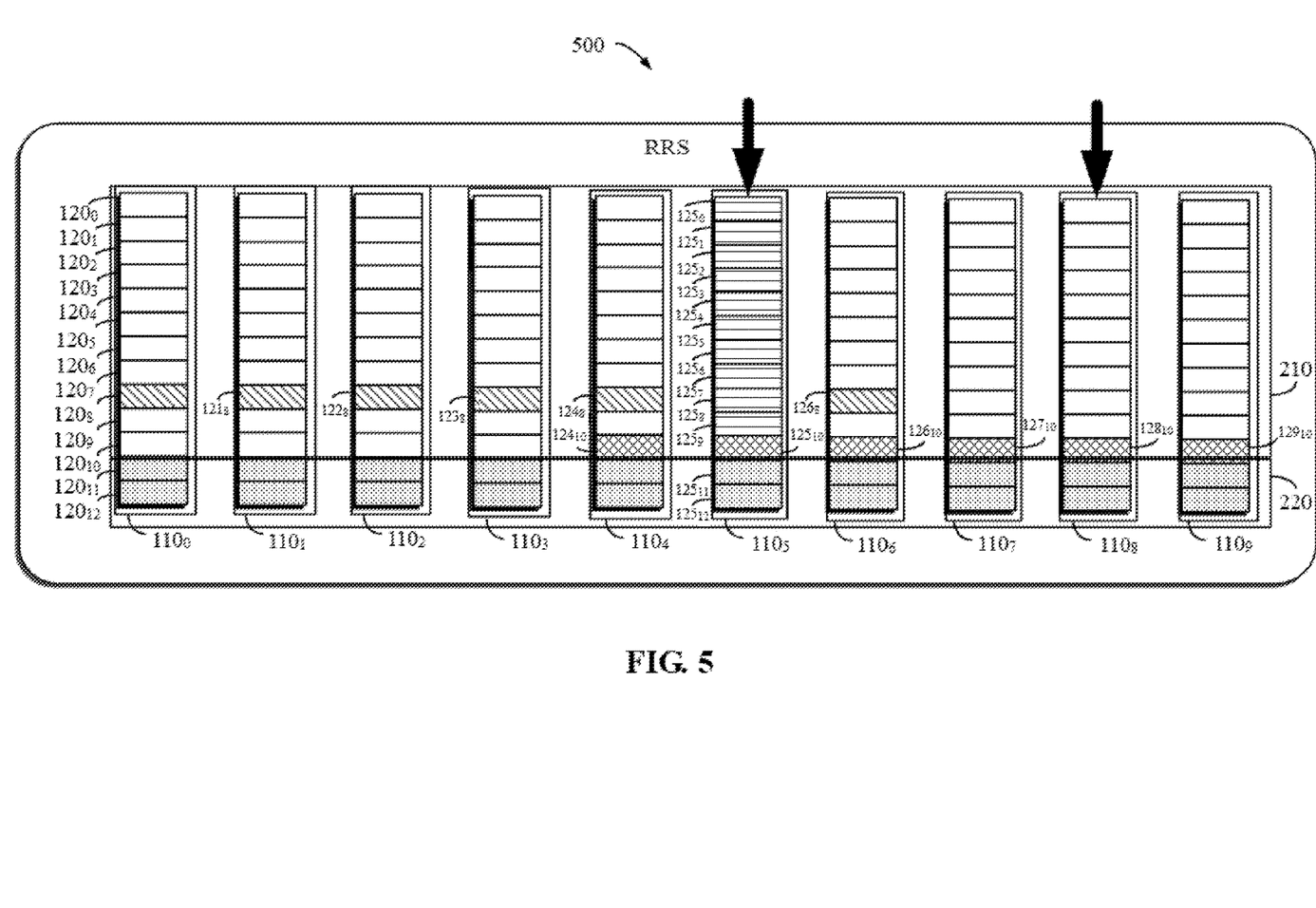
FIG. 5 illustrates a schematic diagram of an RRS in a storage system according to embodiments of the present disclosure.

FIG. 5 illustrates a schematic diagram of RRS 500 in a storage system according to embodiments of the present disclosure.

As shown in FIG. 5, RRS 500 may include multiple disks $110_0$-$110_9$. Each disk may include multiple disk slices. For example, disk $110_0$ includes disk slices $120_0$-$120_{12}$. In the slice pool constituted by disks $110_0$-$110_9$, disk slice section 210 has been used, while disk slice section 220 is allocated to the spare disk so as to facilitate replacement of disk slices that go offline.

In RRS 500 shown in FIG. 5, disk slices $120_8$, $121_8$, $122_8$, $123_8$, $124_8$, and $126_8$ are allocated for constructing a first storage unit, and disk slices $124_{10}$, $125_{10}$, $126_{10}$, $127_{10}$, $128_{10}$ and $129_{10}$ are allocated for constructing a second storage unit, wherein the first and second storage units are both used, for example, for storing user data. It can be seen that the first and second storage units are both of the RAID6 type, that is, there exist two disk slices for redundancy protection.

For example, when disks $110_5$ and $110_6$ go offline, disk slices on disks $110_5$ and $110_6$ are all in an unavailable state. In this case, a storage unit that has degraded performance due to the off-line of disks $110_5$ and $110_6$ can be first determined. It can be seen that disk slice $125_{10}$ in disk $110_5$ and disk slice $126_{10}$ in disk $110_6$ are used to construct the second storage unit, so this second storage unit is degraded. If a further disk goes offline later and disk slices on this disk are used to construct the second storage unit, the second storage unit will not be accessible.

It should be understood that, for an RAID6-type storage unit, the storage unit will not be regarded as having a performance level below a threshold level until there are two malfunctioning disk slices, thereby starting the process of replacing and reconstructing disk slices.

In order to at least partially restore the performance of the second storage unit, it can be determined whether in disk slice section 220 there exist idle spare disk slices that can be used to reconstruct at least one of disk slices $125_{10}$ and $126_{10}$ in the determined second storage unit. If it is determined that there is no idle disk slice, the priority of the second storage unit where the degradation occurs is determined. It has been known that this second storage unit stores user data, so it can be determined that this storage unit has a low priority. That is to say, the second storage unit cannot preempt a disk slice on a storage unit with a higher priority.

Based on the priority of the second storage unit, a candidate storage unit that can be used as a "preempted object" can be determined, wherein the priority of this candidate storage unit should not be higher than that of the second storage unit, and the performance of the candidate storage unit should exceed the threshold level, for example, this candidate storage unit is a storage unit with intact performance. Therefore, the first storage unit can be regarded as the candidate storage unit, that is, the second storage unit can "preempt" a disk slice of the first storage unit to replace at least one of disk slices $125_{10}$ and $126_{10}$ in the second storage unit.

It is necessary to determine disks to which the disk slices in the second storage unit other than the to-be-replaced disk slice $125_{10}$ belong, because disk slices constructing the same storage unit may not belong to the same disk. In addition to disk slices $125_{10}$ and $126_{10}$, disk slices constructing the second storage unit further include disk slices $124_{10}$, $127_{10}$, $128_{10}$, and $129_{10}$ which belong to disks $110_4$ and $110_7$-$110_9$. It can be seen that disk slice $124_8$ constructing the first storage unit belongs to disk $110_4$, so disk slice $124_8$ cannot be used. None of disk slices $120_8$, $121_8$, $122_8$, $123_8$, and $126_8$ constructing the first storage unit belongs to disks $110_4$ and $110_7$-$110_9$. Therefore, any one of disk slices $120_8$, $121_8$, $122_8$, $123_8$, and $126_8$ of the first storage unit can be selected to replace disk slice $125_{10}$ or $126_{10}$ in the second storage unit.

For example, disk slice $125_{10}$ is replaced with disk slice $120_8$ of the first storage unit. After the replacement of the disk slice, disk slices $121_8$, $122_8$, $123_8$, $124_8$, and $126_8$ are allocated for constructing the first storage unit; disk slices $120_8$, $124_{10}$, $127_{10}$, $128_{10}$, and $129_{10}$ are allocated for constructing the second storage unit; and data of disk slices $124_{10}$, $127_{10}$, $128_{10}$, and $129_{10}$ can be used to restore data of disk slice $125_{10}$ on disk slice $120_8$, so as to reconstruct the second storage unit.

In this way, it is ensured that the second storage unit will not be disconnected due to a further malfunction, and at the same time, the first storage unit will only experience performance degradation without being caused to completely go offline.

The above method for managing storage can prevent data loss due to the off-line of storage units, and at the same time can globally stabilize the performance of the entire storage system.

Figure 6:
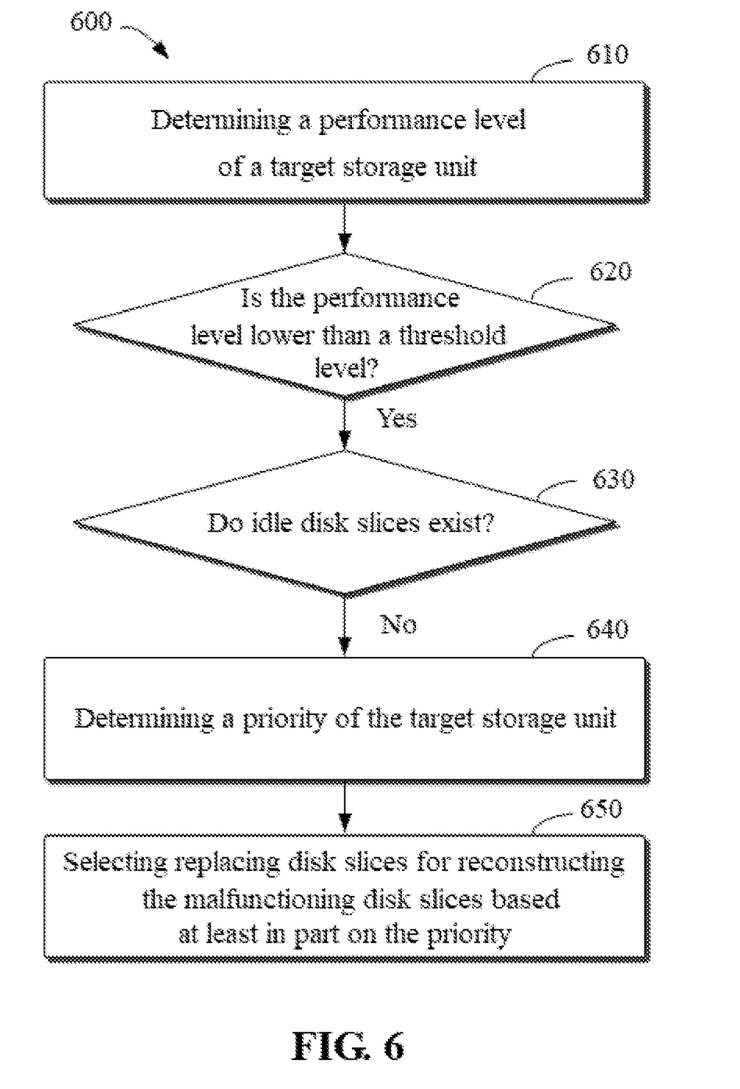
FIG. 6 illustrates a flowchart of a method 600 for storage management according to embodiments of the present disclosure.

FIG. 6 illustrates a flowchart of method 600 for storage management according to some embodiments of the present disclosure. Method 600 can be implemented at any one of mapper 102, physical disk array 104, slice pool 110, and layer 112 shown in FIG. 1. Method 600 may be performed, for example, by any component of operating environment 100 shown in FIG. 1, or may be performed by other computing devices of operating environment 100 shown in FIG. 1.

At block 610, a performance level of a target storage unit is determined. If, at block 620, it is determined that the performance level of the target storage unit is lower than a threshold level, then at block 630, it is determined whether idle disk slices that can be used for reconstructing malfunctioning disk slices in the target storage unit exist in a slice pool.

If it is determined that the idle disk slices that can be used for reconstructing malfunctioning disk slices in the target storage unit do not exist in the slice pool, then at block 640, a priority of the target storage unit is determined.

In some embodiments, a type of data stored in the target storage unit can be determined, and a priority of the target storage unit can be determined based on the type.

In block 650, replacing disk slices for reconstructing the malfunctioning disk slices are selected from available storage units based at least in part on the priority of the target storage unit. The available storage units have performance levels not lower than the threshold level.

In some embodiments, candidate storage units can be determined from the available storage units according to a determination that the priority of the target storage unit exceeds a threshold priority. The priorities of the candidate storage units do not exceed the threshold priority. Disks associated with disk slices in the target storage unit other than the malfunctioning disk slices can be determined, and disk slices that do not belong to the disks can be selected from the candidate storage units as the replacing disk slices.

In some embodiments, candidate storage units can be determined from the available storage units according to a determination that the priority of the target storage unit does not exceed a threshold priority and based on a construction type of the target storage unit and the number of the malfunctioning disk slices. The priorities of the candidate storage units do not exceed the threshold priority. Disks associated with disk slices in the target storage unit other than the malfunctioning disk slices can be determined, and disk slices that do not belong to the disks can be selected from the candidate storage units as the replacing disk slices.

In some embodiments, it can be determined whether the number of the malfunctioning disk slices exceeds a threshold number according to whether the construction type matches a target type. The candidate storage units can be determined from the available storage units according to a determination that the number of the malfunctioning disk slices exceeds the threshold number, wherein the candidate storage units are of the construction type.

In some embodiments, data of disk slices in the storage unit other than the malfunctioning disk slices can be acquired; and the malfunctioning disk slices can be reconstructed by using the data to restore data of the malfunctioning disk slices on the replacing disk slices.

Figure 7:
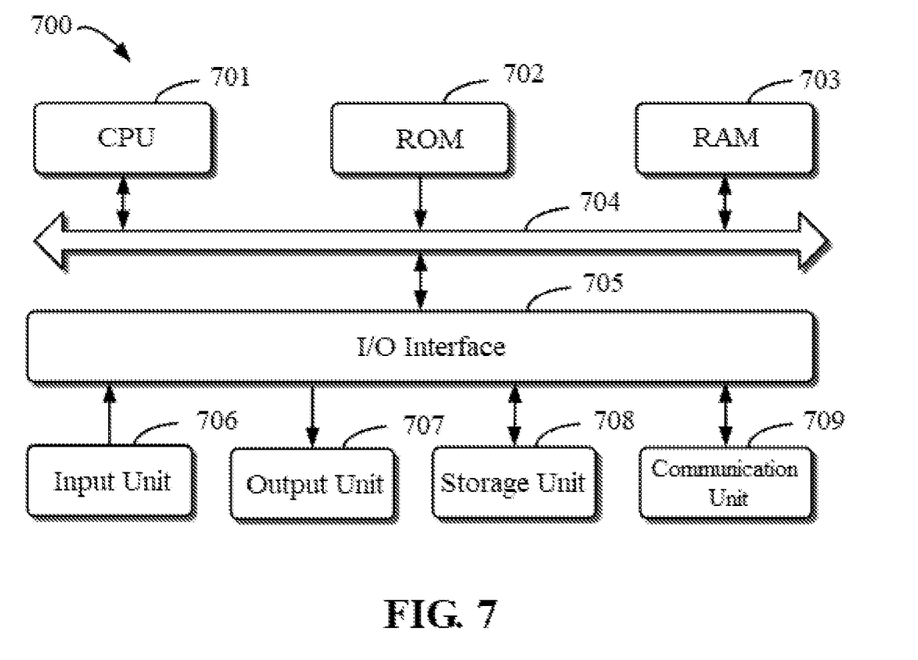
FIG. 7 illustrates a block diagram of an example device that can be used to implement embodiments of the present disclosure.

FIG. 7 illustrates a schematic block diagram of example device 700 that can be used to implement the embodiments of the content of the present disclosure. For example, any one of mapper 102, disk array 104, slice pool 110, and layer 112 shown in FIG. 1 can be implemented by device 700. As shown, device 700 includes central processing unit (CPU) 701 which can perform various appropriate actions and processes according to computer program instructions stored in read only memory (ROM) 702 or computer program instructions loaded from storage unit 708 into random access memory (RAM) 703. In RAM 703, various programs and data required for the operation of unit 700 can also be stored. CPU 701, ROM 702, and RAM 703 are connected to each other through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices through a computer network such as the Internet and/or various telecommunication networks.

The various processes and processing described above, for example, method 600, can be performed by processing unit 701. For example, in some embodiments, method 600 may be embodied as a computer software program that is tangibly included on a machine-readable medium, for example, storage unit 708. In some embodiments, part or all of the computer program may be loaded and/or installed on device 700 via ROM 702 and/or communication unit 709. When a computer program is loaded into RAM 703 and executed by CPU 701, one or more actions of method 600 described above may be performed.

The present disclosure can be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage unit, a magnetic storage unit, an optical storage unit, an electromagnetic storage unit, a semiconductor storage unit, or any suitable combination of the foregoing. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein can be downloaded from a computer-readable storage medium to various computing/processing devices, or downloaded to an external computer or external storage unit via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk, and C++, and conventional procedural programming languages, such as the "C" language or similar programming languages. Computer-readable program instructions may be executed entirely on a user's computer, partly on a user's computer, as a stand-alone software package, partly on a user's computer and partly on a remote computer, or entirely on a remote computer or server. In the case involving a remote computer, the remote computer can be connected to the user's computer through any kind of network, including a local area network (LAN) or a wide area network (WAN), or it can be connected to an external computer (for example connected through the Internet using an Internet service provider). In some embodiments, an electronic circuit is personalized by utilizing the state information of the computer-readable program instructions, for example, a programmable logic circuit, a field programmable gate array (FPGA), or a programmable logic array (PLA), wherein the electronic circuit may execute computer-readable program instructions so as to implement various aspects of the present disclosure.

Various aspects of the present disclosure are described herein with reference to flowcharts and/or block diagrams of the method, the apparatus (system) and the computer program product according to embodiments of the present disclosure. It should be understood that each block of the flowcharts and/or block diagrams, and combinations of blocks in the flowcharts and/or block diagrams, can be implemented by computer-readable program instructions.

These computer-readable program instructions can be provided to a processing unit of a general-purpose computer, a special-purpose computer, or a further programmable data processing apparatuses, thereby producing a machine, such that these instructions, when executed by the processing unit of the computer or the further programmable data processing apparatus, produce a means (e.g., specialized circuitry) for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions can also be loaded onto a computer, a further programmable data processing apparatus, or a further device, so that a series of operating steps can be performed on the computer, the further programmable data processing apparatus, or the further device to produce a computer-implemented process, such that the instructions executed on the computer, the further programmable data processing apparatus, or the further device can implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or a part of an instruction, which contains one or more executable instructions for implementing specified logical functions. In some alternative implementations, the functions marked in the blocks may also occur in a different order than those marked in the drawings. For example, two consecutive blocks may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs the specified function or action, or by a combination of dedicated hardware and computer instructions.

The embodiments of the present disclosure have been described above. The above description is exemplary and not exhaustive, and is not limited to the disclosed embodiments. Many modifications and variations will be apparent to those skilled in the art without departing from the scope and spirit of the described embodiments. The terminology used herein is chosen to best explain the principles and practical applications of the embodiments or technical improvements to technologies in the market, or to enable other ordinary skilled persons in the art to understand the embodiments disclosed herein.

The invention claimed is:

1. A method for storage management, comprising:
determining, according to a determination that a performance level of a target storage unit is lower than a threshold level, whether idle disk slices that can be used for reconstructing malfunctioning disk slices in the target storage unit exist in a slice pool;
determining a priority of the target storage unit according to a determination that the idle disk slices do not exist; and
selecting replacing disk slices for reconstructing the malfunctioning disk slices from available storage units based at least in part on the priority, wherein the available storage units have performance levels not lower than the threshold level.

2. The method according to claim 1, wherein determining a priority of the target storage unit comprises:
determining a type of data stored in the target storage unit; and
determining the priority of the target storage unit based on the type.

3. The method according to claim 1, wherein selecting the replacing disk slices comprises:
determining candidate storage units from the available storage units according to a determination that the priority of the target storage unit exceeds a threshold priority, wherein priorities of the candidate storage units do not exceed the threshold priority;
determining disks associated with disk slices in the target storage unit other than the malfunctioning disk slices; and
selecting, from the candidate storage units, disk slices that do not belong to the disks as the replacing disk slices.

4. The method according to claim 1, wherein selecting the replacing disk slices comprises:
determining candidate storage units from the available storage units according to a determination that the priority of the target storage unit does not exceed a threshold priority and based on a construction type of the target storage unit and the number of the malfunctioning disk slices, wherein priorities of the candidate storage units do not exceed the threshold priority;
determining disks associated with disk slices in the target storage unit other than the malfunctioning disk slices; and
selecting, from the candidate storage units, disk slices that do not belong to the disks as the replacing disk slices.

5. The method according to claim 4, wherein determining the candidate storage units comprises:
determining, according to that the construction type matches a target type, whether the number of the malfunctioning disk slices exceeds a threshold number; and
determining the candidate storage units from the available storage units according to a determination that the number of the malfunctioning disk slices exceeds the threshold number, wherein the candidate storage units are of the construction type.

6. The method according to claim 1, further comprising:
acquiring data of disk slices in the storage unit other than the malfunctioning disk slices; and
reconstructing the malfunctioning disk slices by using the data to restore data of the malfunctioning disk slices on the replacing disk slices.

7. An electronic device, comprising:
a processor; and
a memory coupled to the processor, wherein the memory stores instructions to be executed, which, when executed by the processor, cause the electronic device to perform actions comprising:
determining, according to a determination that a performance level of a target storage unit is lower than a threshold level, whether idle disk slices that can be used for reconstructing malfunctioning disk slices in the target storage unit exist in a slice pool;
determining a priority of the target storage unit according to a determination that the idle disk slices do not exist; and
selecting replacing disk slices for reconstructing the malfunctioning disk slices from available storage units based at least in part on the priority, wherein the available storage units have performance levels not lower than the threshold level.

8. The device according to claim 7, wherein the priority of the target storage unit is determined in the following way:
determining a type of data stored in the target storage unit; and
determining the priority of the target storage unit based on the type.

9. The device according to claim 7, wherein the replacing disk slices are selected in the following way:
determining candidate storage units from the available storage units according to a determination that the priority of the target storage unit exceeds a threshold priority, wherein priorities of the candidate storage units do not exceed the threshold priority;
determining disks associated with disk slices in the target storage unit other than the malfunctioning disk slices; and
selecting, from the candidate storage units, disk slices that do not belong to the disks as the replacing disk slices.

10. The device according to claim 7, wherein the replacing disk slices are selected in the following way:
determining candidate storage units from the available storage units according to a determination that the priority of the target storage unit does not exceed a threshold priority and based on a construction type of the target storage unit and the number of the malfunctioning disk slices, wherein priorities of the candidate storage units do not exceed the threshold priority;
determining disks associated with disk slices in the target storage unit other than the malfunctioning disk slices; and
selecting, from the candidate storage units, disk slices that do not belong to the disks as the replacing disk slices.

11. The device according to claim 10, wherein the candidate storage units are determined in the following way:
determining, according to that the construction type matches a target type, whether the number of the malfunctioning disk slices exceeds a threshold number; and
determining the candidate storage units from the available storage units according to a determination that the number of the malfunctioning disk slices exceeds the threshold number, wherein the candidate storage units are of the construction type.

12. The device according to claim 7, wherein the actions further comprise:

acquiring data of disk slices in the storage unit other than the malfunctioning disk slices; and reconstructing the malfunctioning disk slices by using the data to restore data of the malfunctioning disk slices on the replacing disk slices.

13. A computer program product having a non-transitory computer readable medium which stores a set of instructions to perform storage management; the set of instructions, when carried out by computerized circuitry, causing the computerized circuitry to perform a method of:

determining, according to a determination that a performance level of a target storage unit is lower than a threshold level, whether idle disk slices that can be used for reconstructing malfunctioning disk slices in the target storage unit exist in a slice pool;

determining a priority of the target storage unit according to a determination that the idle disk slices do not exist; and selecting replacing disk slices for reconstructing the malfunctioning disk slices from available storage units based at least in part on the priority, wherein the available storage units have performance levels not lower than the threshold level.

14. The method according to claim 1, wherein selecting replacing disk slices for reconstructing the malfunctioning disk slices from available storage units includes, in response to the priority of the target storage unit being a higher priority than a priority of the particular available storage unit, selecting a disk slice of the particular available storage unit as one of the replacing disk slices.

15. The method according to claim 14, wherein determining a priority of the target storage unit includes:

identifying the target storage unit as storing metadata; and setting the priority of the target storage unit as a higher priority than a storage unit storing user data.

16. The method according to claim 1, wherein the target storage unit and the available storage units are constructed and arranged as ubers, and wherein the method further comprises:

determining that the performance level of the target storage unit is lower than the threshold level by identifying a malfunctioning disk slice in the target storage unit.

* * * * *